UNITED STATES PATENT OFFICE.

E. H. ASHCROFT, J. A. JOHNSON, AND A. S. MOORE, OF LYNN, MASSACHUSETTS, ASSIGNEES, BY MESNE ASSIGNMENTS, OF JOSEPH BURRILL.

IMPROVEMENT IN TREATING LEATHER.

Specification forming part of Letters Patent No. 42,619, dated May 3, 1864; Reissue No. 1,845, dated January 3, 1865.

*To all whom it may concern:*

Be it known that we, E. H. ASHCROFT, J. A. JOHNSON, and A. S. MOORE, all of Lynn, in the county of Essex and Commonwealth of Massachusetts, did obtain from JOSEPH BURRILL, of said Lynn, through an assignment duly recorded in the Patent Office, Letters Patent No. 42,619, dated May 3, 1864, for Improvement in Treating Leather, &c.; and we do hereby declare that the following is a full, clear, and exact description of the same, whereby those skilled in the art will be enabled to fully understand and use it.

The object of this invention is to render coarse, soft, and nearly useless leather (obtained in pretty large quantities in the usual tanning process) firm and as good as the best leather in use.

It is a well-known fact to tanners and dealers in leather that by the powerful astringents employed in the usual process in tanning those parts of the hide which are of loose texture become soft, flabby, and will rapidly absorb water, thereby rendering the leather nearly useless; but by the application of the process to this quality of leather gelatine is returned to it, and thereby it acquires the firmness and all other desirable qualities of the best leather. The process is applicable, however, to leather of every description, and even the best leather is improved by it, rendering it less liable to absorb water rapidly, and making it wear longer than it otherwise would.

In order to execute the process we dissolve gelatine in a weak solution of hemlock-bark, nut-gall, or any other substance containing tannin. The solution of bark or other substance, which at first is very weak and in quantity just enough to dissolve the glue, is gradually strengthened and added in small quantities until the mixture is brought to the proper consistence. This consistence is obtained by using the ingredients in about the following proportions: gelatine, two parts; solution of hemlock-bark or other substance containing tannin, one part. To this mixture we add a small quantity of soap and water, and saturate the leather. In a few minutes after the leather is saturated we immerse it in a weak solution of hemlock-bark or other tannin, alum, and water, composed as follows: hemlock-bark or other tannin, one pound; alum, one-half pound; water, four gallons. We then add a large quantity of alum, about half a pound to the gallon of the previous solution, and after the leather has laid twenty-four hours we dip it again, and after it has laid from six to twelve hours longer it is dried in the shade. The same process is applicable to paper, and by its use the soft, flabby leather is rendered firm, and paper treated becomes strong, durable, and partially impervious to water.

What we claim as new, and desire to secure by Letters Patent, is—

1. The use of gelatine in the treatment of leather after it is tanned for the purpose of improving its quality.

2. The combination of gelatine with solution of hemlock-bark (or other substance containing tannin) and alum, substantially as described, and for the purpose set forth.

E. H. ASHCROFT.
A. S. MOORE.
J. A. JOHNSON.

Witness to E. H. Ashcroft and A. S. Moore:
N. E. SILSBEE.

Witness to A. S. Moore and J. A. Johnson:
JOHN P. WOODBURY.